(12) United States Patent
Lee (10) Patent No.: US 10,988,123 B2
(45) Date of Patent: Apr. 27, 2021

(54) SIMULATOR VALVE AND ELECTRONIC BRAKE SYSTEM USING THE SAME

(71) Applicant: MANDO CORPORATION, Pyeongtaek-si (KR)

(72) Inventor: Chung Jae Lee, Gunpo-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 47 days.

(21) Appl. No.: 16/146,083

(22) Filed: Sep. 28, 2018

(65) Prior Publication Data

US 2019/0100179 A1    Apr. 4, 2019

(30) Foreign Application Priority Data

Sep. 29, 2017  (KR) .......... 10-2017-0127007
Sep. 29, 2017  (KR) .......... 10-2017-0127019

(51) Int. Cl.
*B60T 8/40*       (2006.01)
*B60T 15/02*      (2006.01)
(Continued)

(52) U.S. Cl.
CPC .......... *B60T 8/4081* (2013.01); *B60T 7/042* (2013.01); *B60T 8/17* (2013.01); *B60T 8/365* (2013.01);
(Continued)

(58) Field of Classification Search
CPC .......... B60T 8/4081; B60T 8/409; B60T 8/17; B60T 8/38; B60T 7/042; B60T 13/16;
(Continued)

(56) References Cited

U.S. PATENT DOCUMENTS 5,167,442 A * 12/1992 Alaze ............... B60T 8/365
                                                251/129.02
5,267,785 A * 12/1993 Maisch ............. B60T 8/26
                                                303/119.2
(Continued)

FOREIGN PATENT DOCUMENTS

JP    H10-169822 A   6/1998
KR    10-0808001 B1  2/2008
(Continued)

*Primary Examiner* — Thomas J Williams
(74) *Attorney, Agent, or Firm* — Morgan, Lewis & Bockius LLP (57) ABSTRACT

A simulator valve and an electronic brake system using the same are disclosed. The electronic brake system includes a master cylinder provided with at least one cylinder chamber having a volume changeable according to operation of a pedal, a pedal simulator connected to the cylinder chamber, configured to provide reaction force corresponding to a pedal effort of the pedal, a hydraulic-pressure supply device configured to provide hydraulic pressure to at least one wheel cylinder, an electronic control unit (ECU) configured to operate the hydraulic-pressure supply device, and a simulator valve provided in a flow passage through which the master cylinder is connected to the pedal simulator, and provided with a unidirectional flow passage that allows fluid to flow from the pedal simulator to the cylinder chamber and a bidirectional flow passage that is electronically opened or closed.

4 Claims, 9 Drawing Sheets

(51) Int. Cl.
*B60T 13/68* (2006.01)
*B60T 8/17* (2006.01)
*B60T 13/16* (2006.01)
*B60T 13/58* (2006.01)
*F16K 27/02* (2006.01)
*B60T 8/36* (2006.01)
*B60T 13/14* (2006.01)
*B60T 13/74* (2006.01)
*B60T 7/04* (2006.01)
*F16K 31/06* (2006.01)
*B60T 13/66* (2006.01)

(52) U.S. Cl.
CPC .......... *B60T 13/146* (2013.01); *B60T 13/161* (2013.01); *B60T 13/58* (2013.01); *B60T 13/662* (2013.01); *B60T 13/686* (2013.01); *B60T 13/745* (2013.01); *B60T 15/028* (2013.01); *F16K 27/029* (2013.01); *F16K 31/0665* (2013.01); *B60T 8/363* (2013.01); *B60T 2270/402* (2013.01); *B60T 2270/404* (2013.01); *B60T 2270/82* (2013.01); *F16K 31/0644* (2013.01)

(58) Field of Classification Search
CPC ...... B60T 13/161; B60T 13/66; B60T 13/662; B60T 13/68; B60T 13/686; B60T 13/74; B60T 13/745
USPC .................................. 303/119.2; 251/129.15
See application file for complete search history.

(56) References Cited

U.S. PATENT DOCUMENTS

| | | | | |
|---|---|---|---|---|
| 5,425,575 | A * | 6/1995 | Schmidt | B60K 28/16 303/119.2 |
| 5,609,401 | A * | 3/1997 | Johnston | B60T 8/365 303/113.4 |
| 5,788,344 | A * | 8/1998 | Friedow | B60T 8/34 303/119.2 |
| 5,941,608 | A * | 8/1999 | Campau | B60T 7/042 303/113.4 |
| 6,523,913 | B1 * | 2/2003 | Lauer | B60T 15/028 137/315.03 |
| 7,198,249 | B2 * | 4/2007 | Nakayasu | B60T 8/363 251/30.04 |
| 8,840,199 | B2 * | 9/2014 | Hatano | B60T 13/146 303/115.2 |
| 2008/0237524 | A1 * | 10/2008 | Lee | B60T 8/363 251/324 |
| 2009/0151541 | A1 * | 6/2009 | Sugimoto | G10H 1/34 84/423 R |
| 2019/0049037 | A1 * | 2/2019 | Lee | B60T 8/4081 |

FOREIGN PATENT DOCUMENTS

| | | |
|---|---|---|
| KR | 10-2009-0078847 A | 7/2009 |
| KR | 10-2013-0008162 A | 1/2013 |
| KR | 10-2015-0124691 A | 11/2015 |
| KR | 10-2017-0089450 A | 8/2017 |

* cited by examiner

SIMULATOR VALVE AND ELECTRONIC BRAKE SYSTEM USING THE SAME

CROSS-REFERENCE TO RELATED APPLICATION

This application is based on and claims priority under 35 U.S.C. § 119 to Korean Patent Application Nos. 10-2017-0127007 and 10-2017-0127019, respectively filed on Jul. 29, 2017 and Sep. 29, 2017 in the Korean Intellectual Property Office, the disclosure of which is incorporated by reference in its entirety.

BACKGROUND

1. Field

Embodiments of the present disclosure relate to a simulator valve and an electronic brake system using the same, which may generate a braking force using an electrical signal corresponding to a displacement of a brake pedal.

2. Description of the Related Art

A hydraulic brake system for braking of a vehicle is essentially mounted to a vehicle, and various systems have recently been proposed to obtain stronger and more stable braking force. Examples of hydraulic brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Meanwhile, in order to drive or stop a brake system of the electronic stability control system (ESC), it is necessary for a predetermined amount of fluid to be applied to the electronic stability control system (ESC). In order to implement the ESC brake system, a plurality of electronically-controlled simulator valves may be mounted to a modulator block.

A simulator valve for use in the above-mentioned brake system generally includes a hollow valve housing, a hollow cylindrical sleeve, a valve seat, a magnetic core, and an armature. The hollow valve housing is inserted into a bore of a modulator block, and includes an inlet and an outlet through which fluid or oil communicates with the modulator block. The hollow cylindrical sleeve is inserted into an upper end of the valve housing, and is welded to the upper end of the valve housing. The valve seat is press-fitted into the valve housing, and includes an orifice therein. The magnetic core is welded to the sleeve located opposite to the hollow valve housing. The armature may be movably received in the sleeve.

CITED REFERENCE

Patent Document

Korean Patent Registration No. 10-1276072 (Jun. 18, 2013)

SUMMARY

Therefore, it is an aspect of the present disclosure to provide a simulator valve and an electronic brake system using the same, which can efficiently operate as well as to be easily manufactured at low costs.

Additional aspects of the invention will be set forth in part in the description which follows and, in part, will be obvious from the description, or may be learned by practice of the invention.

In accordance with an aspect of the present disclosure, an electronic brake system includes a master cylinder provided with at least one cylinder chamber having a volume changeable according to operation of a pedal, a pedal simulator connected to the cylinder chamber, configured to provide reaction force corresponding to a pedal effort of the pedal, a hydraulic-pressure supply device configured to provide hydraulic pressure to at least one wheel cylinder, an electronic control unit (ECU) configured to operate the hydraulic-pressure supply device, and a simulator valve provided in a flow passage through which the master cylinder is connected to the pedal simulator, and provided with a unidirectional flow passage that allows fluid to flow from the pedal simulator to the cylinder chamber and a bidirectional flow passage that is electronically opened or closed.

The unidirectional flow passage may be formed by a lip seal provided in the simulator valve.

The simulator valve may include a sleeve, an upper part of which is coupled to a magnet core and a lower part of which is coupled to a valve housing provided with an orifice, an armature configured to move upward and downward in the sleeve, a first elastic member disposed between the magnet core and the armature to provide elastic force to the armature, and a lip seal coupled to an outer surface of the valve housing, and provided with an inclined protrusion. The unidirectional flow passage is opened, because the inclined protrusion is deformed inward when pressure of the pedal simulator is higher than pressure of the master cylinder. The bidirectional flow passage is opened, because the armature moves by the magnet core receiving a current and the orifice is opened.

The sleeve may be press-fitted into an inner surface of the valve housing and coupled to the valve housing by welding.

The simulator valve may include a sleeve, an upper part of which is coupled to a magnet core and a lower part of which is coupled to the lip seal, an armature configured to move upward and downward in the sleeve, a first elastic member disposed between the magnet core and the armature to provide elastic force to the armature, and a valve seat disposed below the armature and provided with an orifice to be opened or closed by the armature, and a second elastic member configured to provide the valve seat with elastic force in a direction of the armature. When pressure of the pedal simulator is higher than pressure of the master cylinder, the unidirectional flow passage is opened or closed by upward or downward movement of the valve seat in a space between the valve seat and the sleeve, or is opened or closed by deformation of an inclined protrusion of the lip seal.

One end of the second elastic member may be supported by the sleeve, and the other end of the second elastic member may pressurize the valve seat at a lower side of the valve seat.

The simulator valve may further include a stopper coupled to a modulator block. The sleeve may be press-fitted into an inner surface of the stopper and coupled to the stopper by welding.

The simulator valve may include a sleeve, an upper part of which is coupled to a magnet core and a lower part of which is coupled to a valve housing, an armature configured to move upward and downward in the sleeve, a first elastic member disposed between the magnet core and the armature to provide elastic force to the armature, and a first valve seat disposed below the armature, and provided with an orifice to be opened or closed by the armature, a second elastic member configured to provide the first valve seat with elastic force in a direction of the armature, and a second valve seat fixed to the valve housing. The unidirectional flow passage is opened or closed by upward or downward movement of the first valve seat in a space between the first valve seat and the second valve seat.

One end of the second elastic member may be supported by the sleeve, and the other end of the second elastic member may pressurize the first valve seat at a lower side of the first valve seat.

One end of the second elastic member may be supported by the valve housing, and the other end of the second elastic member may pressurize the first valve seat at a lower side of the first valve seat.

The first elastic member may allow the second elastic member to have stronger force than force needed to pressurize the first valve seat such that the orifice remains closed in a normal state. When a current is supplied to the magnet core, the armature may move and the orifice may be opened.

In case that pressure of the pedal simulator is higher than pressure of the master cylinder, if a sum of a difference in pressure between the pedal simulator and the master cylinder and force generated when the second elastic member pushes the first valve seat is higher than other force generated when the first elastic member pushes the first valve seat, the unidirectional flow passage may be opened.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

Figure 1:
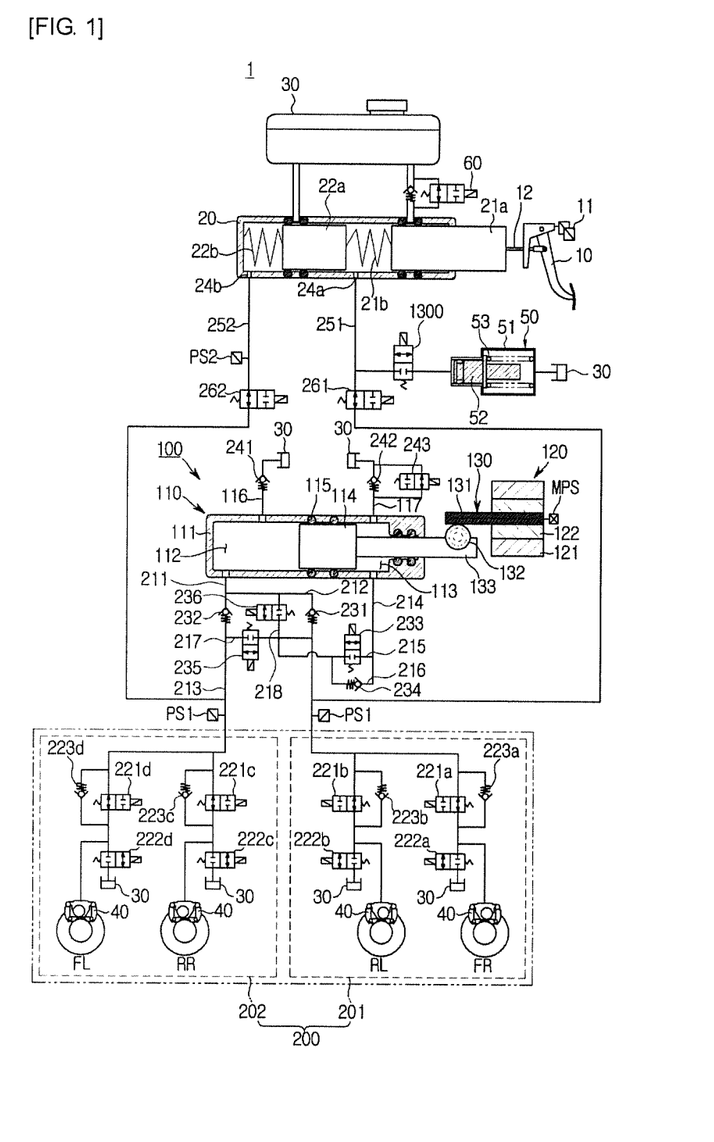
FIG. 1 is a hydraulic circuit diagram illustrating a simulator valve of a first embodiment and a non-braking state of an electronic brake system provided with the simulator valve.

Referring to FIG. 1, an electronic brake system 1 generally includes a master cylinder 20 to generate hydraulic pressure, a reservoir 30 coupled to an upper part of the master cylinder 20 to store oil, an input rod 12 to apply pressure to the master cylinder 20 according to a pedal effort of a brake pedal 10, one or more wheel cylinders 40 to perform braking of respective wheels RR, RL, FR, and FL when hydraulic pressure is transferred thereto, a pedal displacement sensor 11 to sense displacement of the brake pedal 10, and a pedal simulator 50 to provide reaction force corresponding to the pedal effort of the brake pedal 10.

The master cylinder 20 may be provided with at least one chamber to generate hydraulic pressure. For example, the master cylinder 20 may be provided with two cylinder chambers. From among the two cylinder chambers, one cylinder chamber may be provided to a front of a second piston 22a, and the other cylinder chamber may be disposed between a first piston 21a and the second piston 22a. The first piston 21a may be coupled to the input rod 12. The master cylinder 20 may include first and second hydraulic ports 24a and 24b through which hydraulic pressure is discharged outside from two cylinder chambers, respectively.

The master cylinder 20 provided with two cylinder chambers may be designed to secure safety in the event of malfunction. For example, one cylinder chamber from among the two cylinder chambers may be connected to the front right wheel FR and the rear left wheel RL of a vehicle, and the other cylinder chamber may be connected to the front left wheel FL and the rear right wheel RR. By configuring the two cylinder chambers to be independent of each other, braking of the vehicle remains possible even when one of the two cylinder chambers malfunctions.

Alternatively, differently from the drawings, one of the two cylinder chambers may be connected to two front wheels FR and FL, and the other cylinder chamber may be connected to two rear wheels RR and RL. One of the two cylinder chambers may be connected to the front left wheel FL and the rear left wheel RL, and the other cylinder chamber may be connected to the rear right wheel RR and the front right wheel FR. In other words, wheels connected to the cylinder chambers of the master cylinder 20 may be located at various positions.

A first spring 21b may be disposed between the first piston 21a and the second piston 22a of the master cylinder 20, and a second spring 22b may be disposed between the second piston 22a and one end of the master cylinder 20.

The first spring 21b may be contained in one of two cylinder chambers, and the second spring 22b may be contained in the other cylinder chamber. The first spring 21b and the second spring 22b may be compressed by the first piston 21a and the second piston 22a that move in response to change of displacement of the brake pedal 10, so that the first spring 21b and the second spring 22b may store elastic force generated by compression thereof. When force pushing the first piston 21a becomes weaker than the elastic force, the elastic force stored in the first and second springs 21b and 22b may push the first and second pistons 21a and 22a back to original positions thereof.

Meanwhile, the input rod 12 to pressurize the first piston 21a of the master cylinder 20 may closely contact the first piston 21a. Therefore, the brake pedal 10 may directly pressurize the master cylinder 20 without a pedal free stroke region, when the brake pedal 10 is depressed.

The pedal simulator 50 may be connected to a first backup passage 251 so as to provide reaction force corresponding to a pedal effort of the brake pedal 10. The simulation device 50 may provide reaction force to compensate for the pedal effort of the brake pedal 10 depressed by the driver, such that braking force can be precisely adjusted as intended by the driver.

Referring to FIG. 1, the pedal simulator 50 may include a simulation chamber 51 to store oil discharged from a first hydraulic port 24a of the master cylinder 20, a reaction force piston 52 provided in the simulation chamber 51, a pedal simulator provided with a reaction force spring 53 elastically supporting the reaction force piston 52, and a simulation chamber 51. The reaction force piston 52 and the reaction force spring 53 may be installed to have a predetermined range of displacement within the simulation chamber 51 by oil flowing into the simulation chamber 51.

The reaction force spring 53 is merely an example capable of supplying elastic force to the reaction force piston 52, and may be implemented as any of other examples capable of storing elastic force by shape deformation therein. For example, the reaction force spring 53 may be formed of a material such as rubber, or may include various members formed in a coil or plate shape to store elastic force therein.

A normally closed (NC) simulator valve 1300 having a check valve function, that remains closed in a normal state, may be disposed between the pedal simulator 50 and the master cylinder 20. The simulator valve 1300 may act as a check valve for allowing fluid or oil to flow in only one direction from the pedal simulator 50 to the master cylinder 20, and may open an orifice by electrical operation such that fluid or oil can flow in two directions. The simulator valve 1300 will hereinafter be described with reference to FIG. 2.

Figure 2:
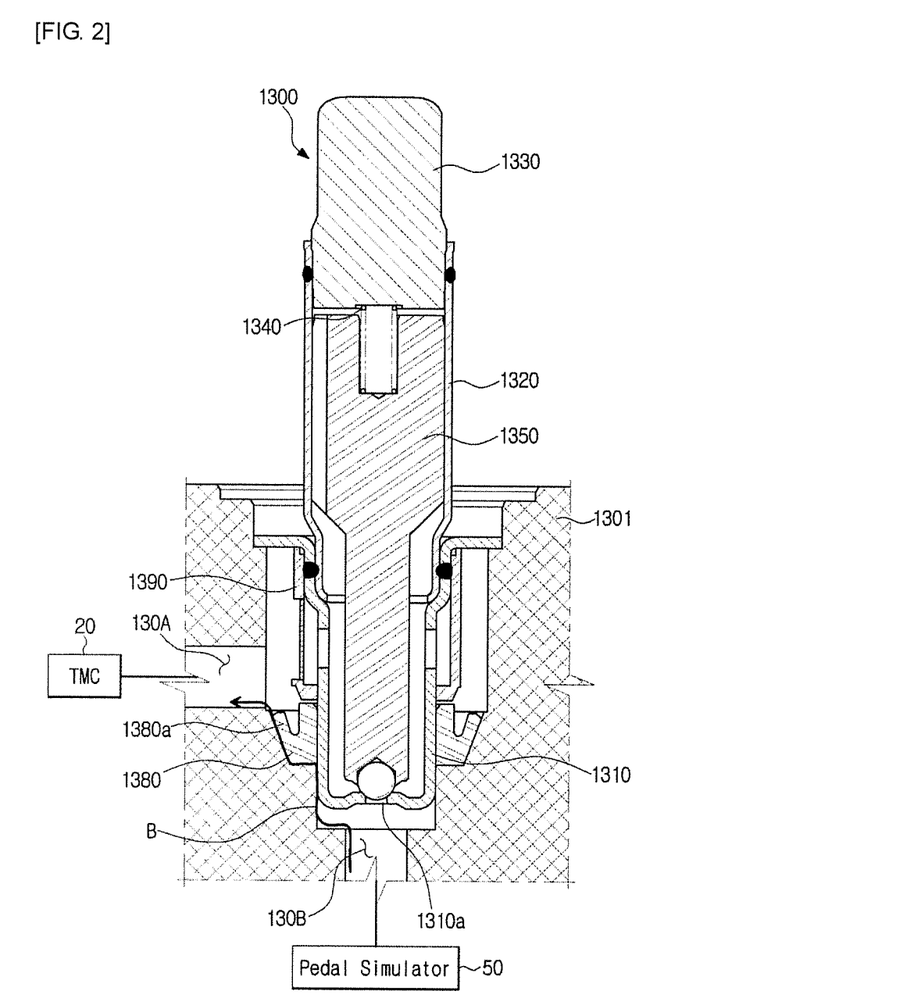
FIG. 2 is a side cross-sectional view illustrating a simulator valve according to a first embodiment of the present disclosure.

Several reservoirs 30 may be shown in FIG. 2, and the respective reservoirs 30 may be denoted by the same reference number. However, the reservoirs 30 may be implemented as the same or different components. For example, the reservoir 30 connected to the pedal simulator 50 may be identical to the reservoir 30 connected to the master cylinder 20, or may store oil therein in a different way from the reservoir 30 connected to the master cylinder 20.

The pedal simulator 50 may operate as follows. If a pedal effort is applied to the brake pedal 10 by the driver of the vehicle, oil stored in the simulation chamber 51 may flow into the reservoir 20 via the simulator valve 54 when the reaction force piston 52 compresses the reaction force spring 53, resulting in formation of proper pedal feel for the driver. In contrast, if the driver takes a foot off the brake pedal 10 to release the pedal effort applied to the brake pedal 10, the reaction force spring 53 pushes the reaction force piston 52 such that the reaction force piston 52 may move back to an original position thereof by elastic force of the reaction force spring 53. In addition, oil stored in the reservoir 30 may flow into the simulation chamber 51, such that the simulation chamber 51 may be fully filled with oil.

As described above, since the simulation chamber 51 is always filled with oil, frictional force of the reaction force piston 52 is minimized during operation of the pedal simulator 50, such that durability of the pedal simulator 50 can be improved and foreign materials from the outside can be prevented from flowing into the pedal simulator 50.

The electric brake system 1 according to the embodiment of the present disclosure may include a hydraulic-pressure supply device 100, a hydraulic control unit 200, a first cut valve 261, a second cut valve 262, and an electronic control unit (ECU) (not shown). The hydraulic-pressure supply device 100 may mechanically operate by receiving an electric signal indicating the driver's braking intention from the pedal displacement sensor 11 sensing displacement of the brake pedal 10. The hydraulic-pressure control unit 200 may include first and second hydraulic circuits 201 and 202, each of which includes two wheels (two of RR, RL, FR, FL) and controls flow of hydraulic pressure supplied to the wheel cylinder 40 disposed in the two wheels (two of RR, RL, FR, FL). The first cut valve 261 may be disposed in a first backup passage 251 configured to interconnect the first hydraulic port 24a and the first hydraulic circuit 201, and may control flow of hydraulic pressure. The second cut valve 262 may be disposed in a second backup passage 252 configured to interconnect the second hydraulic port 24b and the second hydraulic circuit 202, and may control flow of hydraulic pressure. The ECU may control the hydraulic-pressure supply device 100 and valves 60, 221a, 221b, 221c, 221d, 222a, 222b, 222c, 222d, 233, 235, 236, 243, and 1300 based on hydraulic pressure information and pedal displacement information.

The hydraulic-pressure supply device 100 may include a hydraulic-pressure providing unit 110 to provide oil pressure to be supplied to wheel cylinders, a motor to produce rotational force according to an electrical signal from the pedal displacement sensor 11, and a power switching unit 130 to convert rotational motion of a motor 120 into rectilinear motion and to provide the rectilinear motion to the hydraulic-pressure providing unit 110. Alternatively, the hydraulic-pressure providing unit 110 may operate by pressure supplied from a high-pressure accumulator, instead of by driving force supplied from the motor 120.

The hydraulic-pressure providing unit 110 may include a cylinder block 111, a hydraulic piston 114, one or more sealing members 115, and a drive shaft 133. The cylinder block 111 may have a pressure chamber to store oil supplied thereto. The hydraulic piston 114 may be provided in the cylinder block 111. The sealing member 115 may be disposed between the hydraulic piston 114 and the cylinder block 111 to seal the pressure chamber. The drive shaft 133 may be connected to the rear end of the hydraulic piston 114 to transfer power from the power switching unit 130 to the hydraulic piston 114.

The pressure chamber may include a first pressure chamber 112 located at a front side (i.e., a forward direction, see a left side of FIG. 2) of the hydraulic piston 114, and a second pressure chamber 113 located at a rear side (i.e., a backward direction, see a right side of FIG. 2) of the hydraulic piston 114. That is, the first pressure chamber 112 may be divided by the cylinder block 111 and the front end of the hydraulic piston 114, and may have a volume changeable according to movement of the hydraulic piston 114. The second pressure chamber 113 may be divided by the cylinder block 111 and the rear end of hydraulic piston 114, and may have a volume changeable according to movement of the hydraulic piston 114.

The pressure chambers 112 and 113 may be connected to the first hydraulic passage 211 and the fourth hydraulic chamber 214, respectively. The first hydraulic passage 211 may connect the first pressure chamber 112 to the first and second hydraulic circuits 201 and 202. The first hydraulic passage 211 may be divided into a second hydraulic passage 212 communicating with the first hydraulic circuit 201 and a third hydraulic passage 213 communicating with the second hydraulic circuit 202. The fourth hydraulic passage 214 may connect the second pressure chamber 113 to the first and second hydraulic circuits 201 and 202. The fourth hydraulic passage 214 may be divided into a fifth hydraulic passage 215 and a sixth hydraulic passage 216.

The sealing member 115 may be disposed between the hydraulic piston 114 and the cylinder block 111 to seal a gap between the first pressure chamber 112 and the second pressure chamber 113. Hydraulic pressure or negative pressure of the first pressure chamber 112 affected by forward or backward movement of the hydraulic piston 114 may be blocked by the piston sealing member 115, so that the resultant hydraulic pressure or negative pressure of the first pressure chamber 112 can be transmitted to the first and fourth hydraulic passages 211 and 214 without leaking to the second pressure chamber 113.

The first pressure chamber 112 may be connected to the reservoir 30 through a first dump passage 116, such that the first pressure chamber 112 may receive oil from the reservoir 30 and store the received oil or may transmit oil of the first pressure chamber 112 to the reservoir 30. The second pressure chamber 113 may be connected to the reservoir 30 through a second dump passage 117, such that the second pressure chamber 113 may receive oil from the reservoir 30 and store the received oil or may transmit oil of the second pressure chamber 113 to the reservoir 30. For example, the dump passages 116 and 117 may include a first dump passage 116 that is branched from the first pressure chamber 112 and connected to the reservoir 30, and a second dump passage 117 that is branched from the second pressure chamber 113 and connected to the reservoir 30.

The second hydraulic passage 212 may communicate with the first hydraulic circuit 201, and the second hydraulic passage 213 may communicate with the second hydraulic circuit 202. Therefore, hydraulic pressure may be transmitted to the first and second hydraulic circuits 201 and 202 by forward movement of the hydraulic piston 114.

The electronic brake system 1 according to the embodiment of the present disclosure may include a first control valve 231 that is provided in the second hydraulic passage 212 to control flow of oil, and a second control valve 232 that is provided in the third hydraulic passage 213 to control flow of oil.

The first or second control valve 231 or 232 may be implemented as a check valve that allows oil to flow from the first pressure chamber 112 to the first or second hydraulic circuit 201 or 202 and prevents oil from flowing from the first or second hydraulic circuit 201 or 202 to the first pressure chamber 112. That is, the first or second control valve 231 or 232 may allow hydraulic pressure of the first pressure chamber 112 to flow into the first or second hydraulic circuit 201 or 202, and may prevent hydraulic pressure of the first or second hydraulic circuit 201 or 202 from leaking to the first pressure chamber 112 through the second or third hydraulic passage 212 or 213.

The electronic brake system 1 may include a third control valve 233 provided in the fifth hydraulic passage 215 to control flow of oil, and a fourth control valve 234 provided in the sixth hydraulic passage 216 to control flow of oil.

The third control valve 233 may be implemented as a bidirectional control valve to control bidirectional flow of oil between the second pressure chamber 113 and the first hydraulic circuit 201. The third control valve 233 may be implemented as a normally closed (NC) solenoid valve that remains closed in a normal state and then opened upon receiving an opening signal from the ECU.

The fourth control valve 234 may be arranged parallel to the third control valve 233, such that the fourth control valve may be implemented as a check valve that allows oil to flow from the second pressure chamber 113 to the first hydraulic circuit 201 and prevents oil from flowing from the first hydraulic circuit 201 to the second pressure chamber 113.

The electronic brake system 1 according to the embodiment of the present disclosure may include a fifth control valve 235 provided in the seventh hydraulic passage 217 interconnecting the second hydraulic passage 212 and the third hydraulic passage 213 so as to control flow of oil, and a sixth control valve 236 provided in the eighth hydraulic passage 218 interconnecting the second hydraulic passage 212 and the seventh hydraulic passage 217 so as to control flow of oil.

The fifth control valve 235 and the sixth control valve 236 may be implemented as normally closed (NC) solenoid valves that remain closed in a normal state and then opened upon receiving an opening signal from the ECU.

When the first control valve 231 or the second control valve 232 abnormally operates, the fifth control valve 235 and the sixth control valve 236 are opened such that hydraulic pressure of the first pressure chamber 112 can flow into the first hydraulic circuit 201 and the second hydraulic circuit 202.

The fifth control valve 235 and the sixth control valve 236 may be opened when hydraulic pressure of the wheel cylinder 40 flows into the first pressure chamber 112, because the first control valve 231 provided in the second hydraulic passage 212 and the second control valve provided in the third hydraulic passage 213 are implemented as check valves for allowing oil to flow only in one direction.

The electronic brake system 1 according to the embodiment of the present disclosure may include a first dump valve 241 provided in the first dump passage 116 to control flow of oil, and a second dump valve 242 provided in the second dump passage 117 to control flow of oil. The first dump valve 241 may be implemented as a check valve that allows oil to flow from the reservoir 30 to the first pressure chamber 112 and prevents oil from flowing from the first pressure chamber 112 to the reservoir 30. The second dump valve 242 may be implemented as a check valve that allows oil to flow from the reservoir 30 to the second pressure chamber 113 and prevents oil from flowing from the second pressure chamber 113 to the reservoir 30.

The second dump passage 117 may include a bypass passage. A third dump passage 243 to control flow of oil between the second pressure chamber 113 and the reservoir 30 may be provided in the bypass passage.

The third dump valve 243 may be implemented as a bidirectional solenoid valve to control bidirectional flow of oil. The third dump valve 243 may be implemented as a normally opened (NO) solenoid valve that remains opened in a normal state and the closed upon receiving a closing signal from the ECU.

The hydraulic-pressure providing unit 110 may operate in a double-acting manner. That is, hydraulic pressure produced in the first pressure chamber 112 by forward movement of the hydraulic piston 114 may be transmitted to the first hydraulic circuit 201 through the first hydraulic passage 211 and the second hydraulic passage 212, thereby operating the wheel cylinders 40 installed in the front right wheel FR and the rear left wheel RL. In addition, hydraulic pressure produced in the first pressure chamber 112 by forward movement of the hydraulic piston 114 may be transmitted to the second hydraulic circuit 202 through the first hydraulic passage 211 and the third hydraulic passage 213, thereby operating the wheel cylinders 40 installed in the rear right wheel RR and the front left wheel FL.

Negative pressure produced in the first pressure chamber 112 by backward movement of the hydraulic piston 114 may suction oil from the wheel cylinders 40 installed in the front right wheel FR and the rear left wheel RL, and may transmit the suctioned oil to the first pressure chamber 112. In addition, the negative pressure produced in the first pressure chamber 112 by backward movement of the hydraulic piston 114 may suction oil from the wheel cylinder 40 installed in the rear right wheel RR and the front left wheel FL, and may transmit the suctioned oil to the first pressure chamber 112.

The motor 120 and the power switching unit 130 of the hydraulic-pressure supply device 100 will hereinafter be described.

The motor 120 may produce rotational force according to an output signal of the ECU (not shown), and may produce rotational force in a forward or backward direction. A rotational angular speed and a rotation angle of the motor 120 may be precisely controlled. The motor 120 is well known to those skilled in the art, and as such a detailed description thereof will herein be omitted for convenience of description.

The ECU may control the motor 120 and valves 60, 221a, 221b, 221c, 221d, 222a, 222b, 222c, 222d, 233, 235, 236, 243, and 1300 included in the electronic brake system 1 to be described later.

Driving force of the motor 120 may generate displacement of the hydraulic piston 114 through the power switching unit 130. Hydraulic pressure generated by the hydraulic piston 114 slidably moving within the pressure chamber may be transmitted to the wheel cylinders 40 respectively installed at the wheels RR, RL, FR, and FL through the first and second hydraulic passages 211 and 212.

The power switching unit 130 may convert rotational force into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the hydraulic piston 114, such that the hydraulic piston 114 may slidably move within the cylinder block 111.

In more detail, a signal sensed by the pedal displacement sensor 11 due to displacement of the brake pedal 10 may be transmitted to the ECU (not shown), and the ECU may operate the motor 120 in one direction so that the worm shaft 131 may also rotate in one direction. Rotational force of the worm shaft 131 may be transmitted to the drive shaft 133 through the worm wheel 132, and the hydraulic piston 114 connected to the drive shaft 133 moves forward, so that hydraulic pressure occurs in the first pressure chamber 112.

In contrast, when a pedal effort is removed from the brake pedal 10, the ECU may operate the motor 120 in an opposite direction so that the worm shaft 131 may also rotate in the opposite direction. Accordingly, the worm wheel 132 may also rotate in the opposite direction, and the hydraulic piston 114 connected to the drive shaft 133 moves back to the original position thereof (by backward movement), thereby generating negative pressure in the first pressure chamber 112. As described above, the hydraulic-pressure supply device 100 may transmit or suction hydraulic pressure to or from the wheel cylinders 40 according to a rotation direction of rotational force produced by the motor 120.

Meanwhile, when the motor 120 rotates in one direction, hydraulic pressure may occur in the first pressure chamber 112 or negative pressure may occur in the second pressure chamber 113. Information as to whether to brake the vehicle using hydraulic pressure or information as to whether to release braking using negative pressure may be determined by controlling valves 60, 221a, 221b, 221c, 221d, 222a, 222b, 222c, 222d, 233, 235, 236, 243, and 1300.

The power switching unit 130 may also be formed of a ball-screw-nut assembly. For example, the power switching unit 130 may include a screw that is integrated with a rotational shaft of the motor 120 or rotates with the rotational shaft of the motor 120, and a ball nut that is screw-coupled to the screw in a restricted rotation state and performs rectilinear motion according to rotation of the screw. The hydraulic piston 114 may be connected to the ball nut of the power switching unit 130, and may pressurize the pressure chamber by rectilinear movement of the ball nut. The above-mentioned ball-screw-nut assembly to convert rotational force into rectilinear motion is well known to those skilled in the art, and as such a detailed description thereof will herein be omitted.

The electronic brake system 1 according to the embodiment of the present disclosure may further include a first backup passage 251 and a second backup passage 252, each of which is configured to directly transmit oil discharged from the master cylinder 20 to the wheel cylinders 40 during abnormal operation of the electronic brake system 1. The first backup passage 251 may be provided with the first cut valve 261 for controlling flow of oil, and the second backup passage 252 may be provided with the second cut valve 262 for controlling flow of oil. The first backup passage 251 may connect the first hydraulic port 24a to the first hydraulic circuit 201, and the second backup passage 252 may connect the second hydraulic port 24b to the second hydraulic circuit 202.

The first and second cut valves 261 and 262 may be implemented as normally opened (NO) solenoid valves that remain opened in a normal state and then closed upon receiving a closing signal from the ECU.

The hydraulic control unit 200 may include a first hydraulic circuit 201 to control two wheels upon receiving hydraulic pressure, and a second hydraulic circuit 202 to control the two other wheels upon receiving hydraulic pressure. For example, the first hydraulic circuit 201 may control the front right wheel FR and the rear left wheel RL. The second hydraulic circuit 202 may control the front left wheel FL and the rear right wheel RR. The wheel cylinders 40 may be respectively installed in the four wheels FR, FL, RR, and RL, such that the wheel cylinders 40 may receive hydraulic pressure from the hydraulic-pressure supply device 100, resulting in braking of the vehicle.

The first and second hydraulic circuits 201 and 202 may include a plurality of inlet valves 221 (221a, 221b, 221c, 221d) to control flow of hydraulic pressure. The first hydraulic circuit 201 may be provided with two inlet valves 221a and 221b connected to the first hydraulic passage 211 such that the two inlet valves 221a and 221b may respectively control hydraulic pressures applied to two wheel cylinders 40. The second hydraulic circuit 202 may be provided with two inlet valves 221c and 221d connected to the second hydraulic passage 212 such that the two inlet valves 221c and 221d may respectively control hydraulic pressures applied to the wheel cylinders 40.

In this case, the inlet valves 221 may be arranged upstream of the wheel cylinders 40. The inlet valves 221 may be implemented as normally opened (NO) solenoid valves that remain opened in a normal state and then closed upon receiving a closing signal from the ECU.

The first and second hydraulic circuits 201 and 202 may include check valves 223a, 223b, 223c, and 223d provided in bypass passages by which front ends and rear ends of the respective inlet valves 221a, 221b, 221c, and 221d are connected to each other. The check valves 223a, 223b, 223c, and 223d may allow oil to flow from the wheel cylinders 40 to the hydraulic-pressure providing unit 110 and prevents oil from flowing from the hydraulic-pressure providing unit 110 to the wheel cylinders 40. The check valves 223a, 223b, 223c, and 223d may allow brake pressure of the wheel cylinders 40 to be rapidly discharged. Alternatively, during abnormal operation of the inlet valves 221a, 221b, 221c, and 221d, the check valves 223a, 223b, 223c, and 223d may allow hydraulic pressure of the wheel cylinders 40 to flow into the hydraulic-pressure providing unit 110.

The first and second hydraulic circuits 201 and 202 may further include a plurality of outlet valves 222 (222a, 222b, 222c, 222d) connected to the reservoir 30 so as to improve performance or throughput when braking is released. The outlet valves 222 may be respectively connected to the wheel cylinders 40 so as to control hydraulic pressure discharged from the respective wheels RR, RL, FR, and FL. That is, the outlet valves 222 may sense brake pressures of the respective wheels RR, RL, FR, and FL. If decompression braking is needed, the outlet valves 222 may be selectively opened to control pressure.

The outlet valves 222 may be implemented as normally closed (NC) solenoid valves that remain closed in a normal state and then opened upon receiving an opening signal from the ECU.

The hydraulic control unit 200 may be connected to the backup passages 251 and 252. For example, the first hydraulic circuit 201 may be connected to the first backup passage 251 so as to receive hydraulic pressure from the master cylinder 20, and the second hydraulic circuit 202 may be connected to the second backup passage 252 so as to receive hydraulic pressure from the master cylinder 20.

The first backup passage 251 may be linked to the first hydraulic circuit 201 at upstream sides of the first and second inlet valves 221a and 221b. Likewise, the second backup passage 252 may be linked to the second hydraulic circuit 202 at upstream sides of the third and fourth inlet valves 221c and 221d. Therefore, hydraulic pressure supplied from the hydraulic-pressure providing unit 110 when the first and second cut valves 261 and 262 are closed may be supplied to the wheel cylinders 40 through the first and second hydraulic circuits 201 and 202. Hydraulic pressure supplied from the master cylinder 20 when the first and second cut valves 261 and 262 are opened may be supplied to the wheel cylinders 40 through the first and second backup passages 251 and 252. In this case, the plurality of inlet valves 221a, 221b, 221c, and 221d remain opened, so that operation states of the inlet valves 221a, 221b, 221c, and 221d need not be changed.

Meanwhile, reference numeral 'PS1' not illustrated is a hydraulic-passage pressure sensor to sense hydraulic pressure of the hydraulic circuit 201 or 202. Reference numeral 'PS2' not illustrated is a backup-passage pressure sensor to measure oil pressure of the master cylinder 20, and reference numeral 'MPS' not illustrated is a motor control sensor to control either a rotation angle of the motor 120 or a current of the motor 120.

Figure 3:
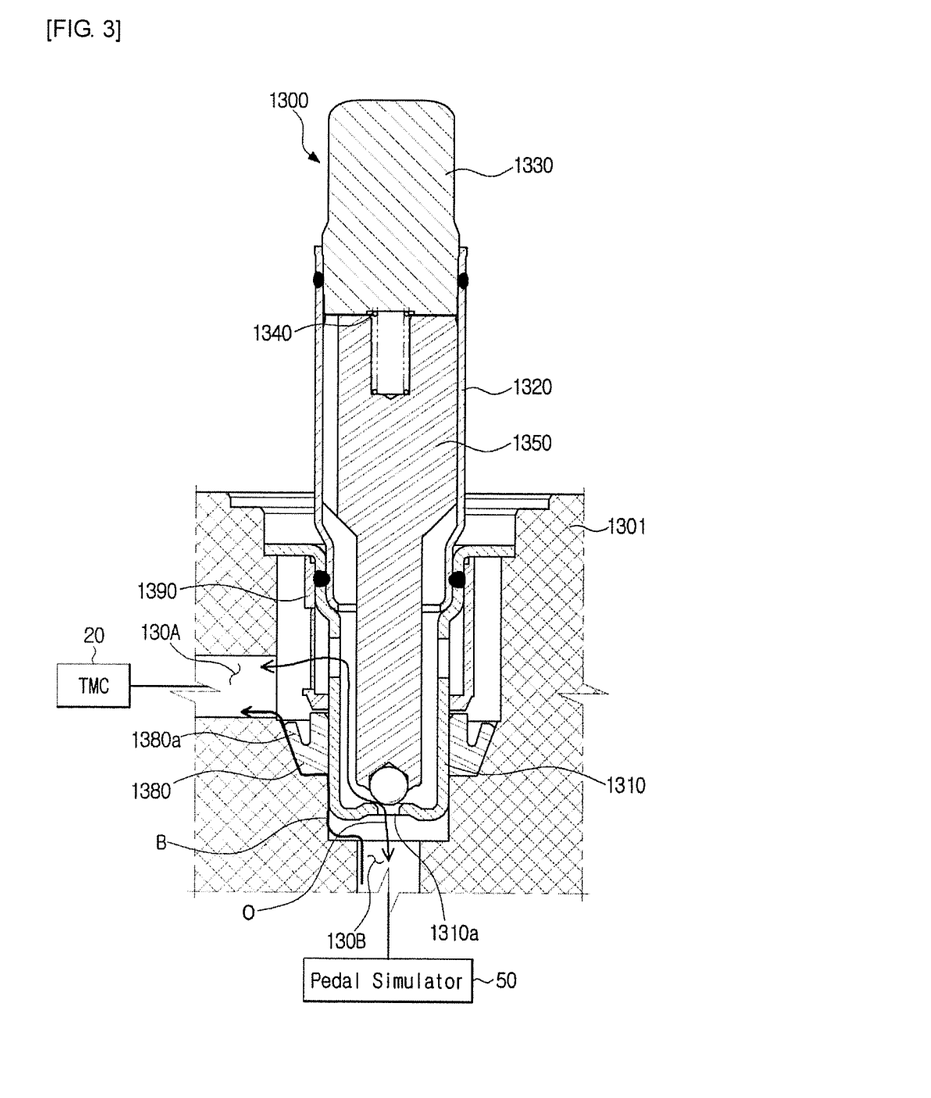
FIG. 3 is a side cross-sectional view illustrating an open simulator valve according to a first embodiment of the present disclosure.

FIG. 2 is a side cross-sectional view illustrating a normal state of a simulator valve for an electronic brake system according to a first embodiment of the present disclosure. FIG. 3 is a side cross-sectional view illustrating an open simulator valve according to the first embodiment of the present disclosure. Referring to FIGS. 2 and 3, the simulator valve 1300 according to the first embodiment may be provided in a flow passage that connects the master cylinder 20 to the pedal simulator 50, and may include not only a unidirectional flow passage (B) that allows flow of fluid or oil in the direction from the pedal simulator 50 to the cylinder chamber, but also a bidirectional flow passage (0) to be electronically opened or closed. The unidirectional flow passage (B) may be formed by a lip seal 1380 provided in the simulator valve 1300.

The simulator valve 1300 may include a sleeve 1320, an armature 1350, an elastic member 1340, and a lip seal 1380. A magnet core 1330 may be fastened to an upper part of the sleeve 1320, and a valve housing 1310 provided with an orifice 1310 may be fastened to a lower part of the sleeve 1320. The armature 1350 may move upward and downward in the sleeve 1320. The elastic member 1340 may be disposed between the magnet core 1330 and the armature 1350, and may provide elastic force to the armature 1350. The lip seal 1380 may be fastened to an outer surface of the valve housing 1310, and may include an inclined protrusion 1380a. In the unidirectional flow passage (B), if pressure of the pedal simulator 50 is higher than pressure of the master cylinder 20, the inclined protrusion 1380a is deformed inward such that the unidirectional flow passage (B) may be opened. In the bidirectional flow passage (0), if a current is supplied to the magnet core 1330, the armature 1350 moves such that an orifice 1310a may be opened.

The simulator valve 1300 may open or close the flow passage using the armature 1350 moving up and down by the magnet core 1330, such that the simulator valve 1300 may control the amount of fluid (or oil) flowing in the bidirectional flow passage (0) for interconnecting a first port 130A and a second port 130B. In this case, the first port 130A may be provided in the vicinity of the master cylinder 20, and the second port 130B may be provided in the vicinity of the pedal simulator 50.

The valve housing 1310 may be embedded in a bore of a modulator block 1301. The modulator block 1301 may be formed as a rectangular block in which not only the simulator valve 1300 but also the above-mentioned constituent elements of the electronic brake system are embedded compactly and densely.

The sleeve 1320 may be coupled to the valve housing 1310, and the magnet core 1330 may be installed at an upper side of the sleeve 1320. The sleeve 1320 may accommodate the armature 1350 therein, and may restrict horizontal movement of the armature 1350 in a manner that the armature 1350 can move upward and downward only in a longitudinal direction. In this case, the sleeve 1320 may be press-fitted into the valve housing 1310 and coupled to the valve housing 1310 by welding.

The magnet core 1330 may be press-fitted into the upper side of the sleeve 1320, such that the open upper end of the sleeve 1320 is closed. Although not shown in the drawings, a coupling groove may be formed in the magnet core 1330, and the magnet core 1330 may be pressed to allow the sleeve 1320 to be caught in the coupling groove, such that the magnet core 1330 and the sleeve 1320 can be more closely and tightly coupled to each other. The above-mentioned coupling structure can facilitate coupling between the sleeve 1320 and the magnet core 1330 while simultaneously simplifying a coupling process, as compared to the welding coupling scheme.

The armature 1350 may be installed to move upward and downward in the sleeve 1320, and a ball may be coupled to a lower end of the armature 1350 so that the armature 1350 may be in contact with the valve housing 1310 having the orifice 1310*a*. An upper groove of the armature 1350 may be arranged to face the magnet core 1330, resulting in formation of a space in which the first elastic member 1340 is inserted to be described later.

One end of the first elastic member 1340 may be in contact with the upper groove of the armature 1350, and the other end of the first elastic member 1340 may be in contact with the magnet core 1330. The first elastic member 1340 may apply elastic force to the armature 1350 so that the simulator valve 1300 may remain closed in a normal state. When magnetic force does not occur in the magnet core 1330 in a normal state, the armature 1350 remains pressed downward by the first elastic member 1340. When the magnet core 1330 produces magnetic force, the armature 1350 moves upward so that the bidirectional flow passage (0) is opened through the orifice 1310*a*.

The lip seal 1380 may be fastened to the outer circumference of the valve housing 1310, and may include an inclined protrusion 1380*a* deformed by a pressure difference such that fluid or oil can flow only in one direction. When pressure of the second port 130B is higher than pressure of the first port 130A, the inclined protrusion 1380*a* is curved in a gap-reducing direction, such that the unidirectional flow passage (B) is opened. In contrast, when pressure of the first port 130A is lower than pressure of the second port 130B, the inclined protrusion 1380*a* is curved in a gap-increasing direction, such that the unidirectional flow passage (B) is closed.

A filter member 1390 may include a mesh portion provided at the surface facing the first port 130A, and may be installed at the outer surface of the valve housing 1310. The filter member 1390 may prevent inflow or outflow of foreign materials contained in the operating fluid flowing through the bidirectional or unidirectional flow passage (0 or B).

The simulator valve 1300 including the above-mentioned constituent elements may include the bidirectional flow passage (0) formed when the armature 1350 moves upward by operation of the magnet core 1330, and the unidirectional flow passage (B) provided between the lip seal 1380 and the modulator block 1301. In this case, the bidirectional flow passage (0) may be opened by operation of the magnet core 1330. The inclined protrusion 1380*a* is deformed inward only when pressure of the simulator 50 is higher than pressure of the master cylinder 20 in the unidirectional flow passage (B), such that the unidirectional flow passage (B) may be restrictively opened. As a result, when the amount of fluid (or oil) flowing from the simulator 50 to the master cylinder 20 is instantaneously increased, the width of the flow passage may be increased in response to the increased amount of fluid.

Figure 4:
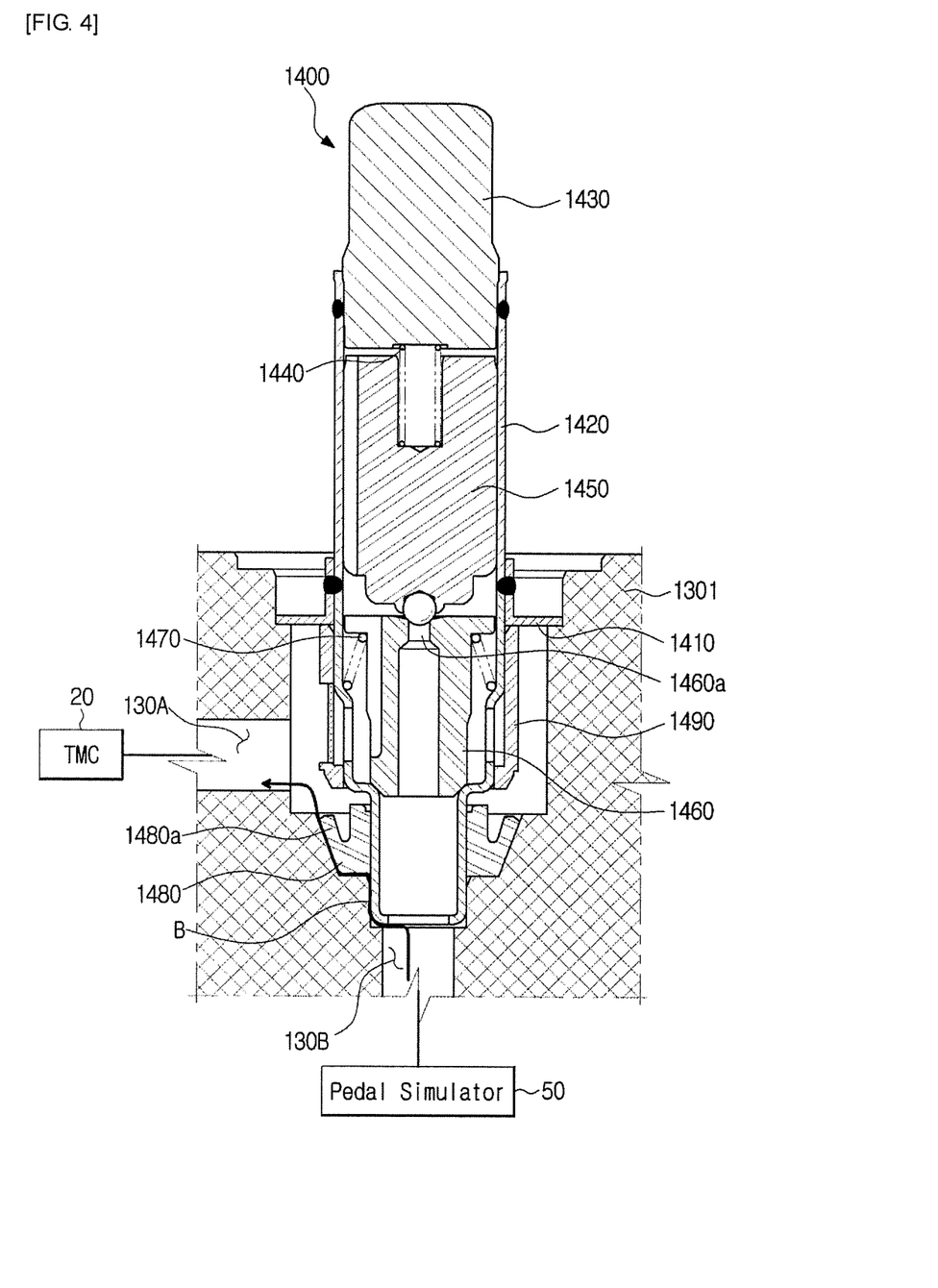
FIG. 4 is a side cross-sectional view illustrating a simulator valve according to a second embodiment of the present disclosure.
Figure 5:
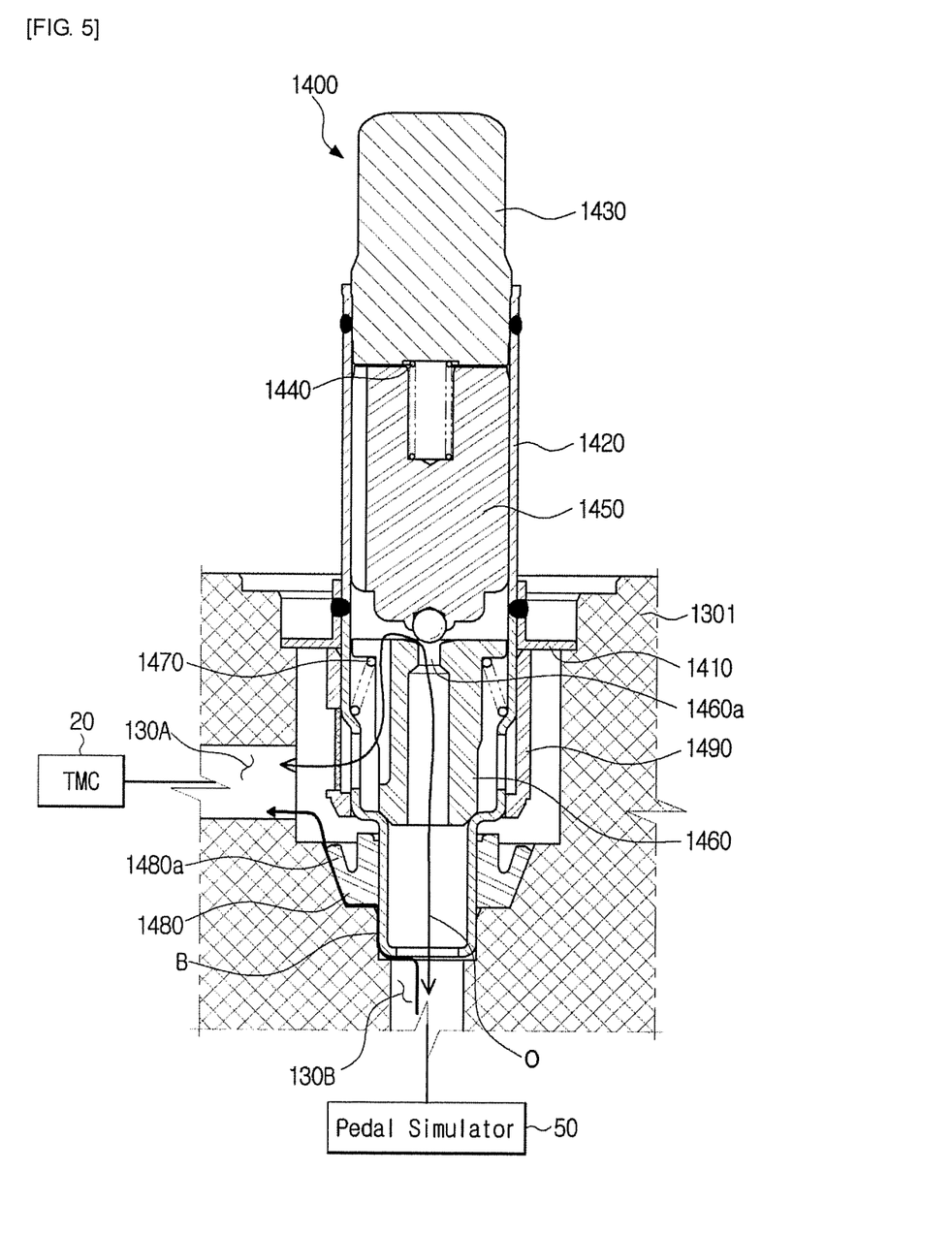
FIG. 5 is a side cross-sectional view illustrating an open simulator valve according to a second embodiment of the present disclosure.

FIG. 4 is a side cross-sectional view illustrating a simulator valve according to a second embodiment of the present disclosure. FIG. 5 is a side cross-sectional view illustrating an open simulator valve according to a second embodiment of the present disclosure. Referring to FIGS. 4 and 5, the simulator valve 1400 for the electronic brake system according to the second embodiment may include a sleeve 1420, an armature 1450, a first elastic member 1440, a valve seat 1460, a second elastic member 1470, a lip seal 1480, and a filter member 1490. The sleeve 1420 may guide upward or downward movement of the armature 1450. A magnet core 1430 may be fastened to an upper part of the sleeve 1420, and a lip seal 1480 may be fastened to a lower part of the sleeve 1420. The armature 1450 may move upward and downward in the sleeve 1320. The first elastic member 1440 may be disposed between the magnet core 1430 and the armature 1450, and may provide elastic force to the armature 1450. The valve seat 1460 may be located below the armature 1450, and may have an orifice 1460*a* to be opened or closed by the armature 1450. The second elastic member 1470 may provide the valve seat 1460 with elastic force in the direction of the armature 1450. The filter member 1490 may filter out foreign materials. If pressure of the pedal simulator 50 is higher than pressure of the master cylinder 20, the unidirectional flow passage (B) may be opened or closed by upward or downward movement of the valve seat 1460 in a space between the valve seat 1460 and the sleeve 1420, or may be opened or closed by deformation of the inclined protrusion 1480*a* of the lip seal 1480.

A stopper 1410 may be a means for fastening the simulator valve 1400 to the modulator block 1301. The sleeve 1420 may be press-fitted into the stopper 1410 and coupled to the stopper 1410 by welding.

The valve seat 1460 may be disposed between the armature 1450 and a lower stepped portion of the sleeve 1420, and may include an orifice 1460*a* that is opened or closed by the armature 1450 at the lower part of the armature 1450. In this case, one end of the second elastic member 1470 may be supported by a curved part of a lower end of the sleeve 1420, and the other end of the second elastic member 1470 may provide elastic force by pressurizing the valve seat 1460.

The unidirectional flow passage (B) may include a first unidirectional flow passage (B) formed by deformation of the inclined protrusion 1480*a* of the lip seal 1480, and a second unidirectional flow passage (B) disposed between the valve seat 1460 and the sleeve 1420. Here, in the second unidirectional flow passage (B), under the condition that pressure of the pedal simulator 50 is higher than pressure of the master cylinder 20, if the sum of a difference in pressure between the pedal simulator 50 and the master cylinder 20 and force generated when the second elastic member 1470 pushes the armature 1450 is higher than force generated when the first elastic member 1440 pushes the armature 1450, the second unidirectional flow passage (B) may be opened.

Figure 6:
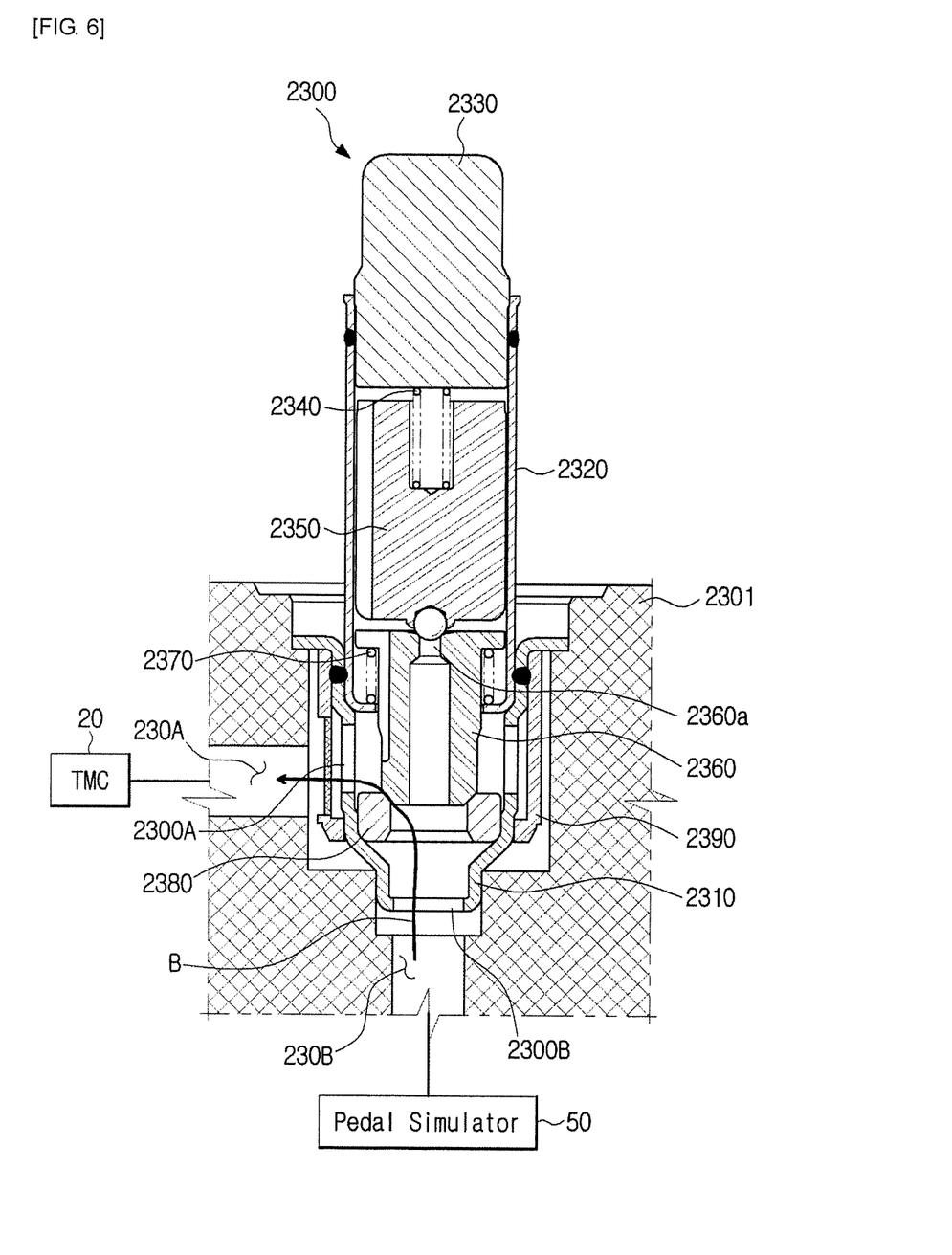
FIG. 6 is a side cross-sectional view illustrating a simulator valve according to a third embodiment of the present disclosure.
Figure 7:
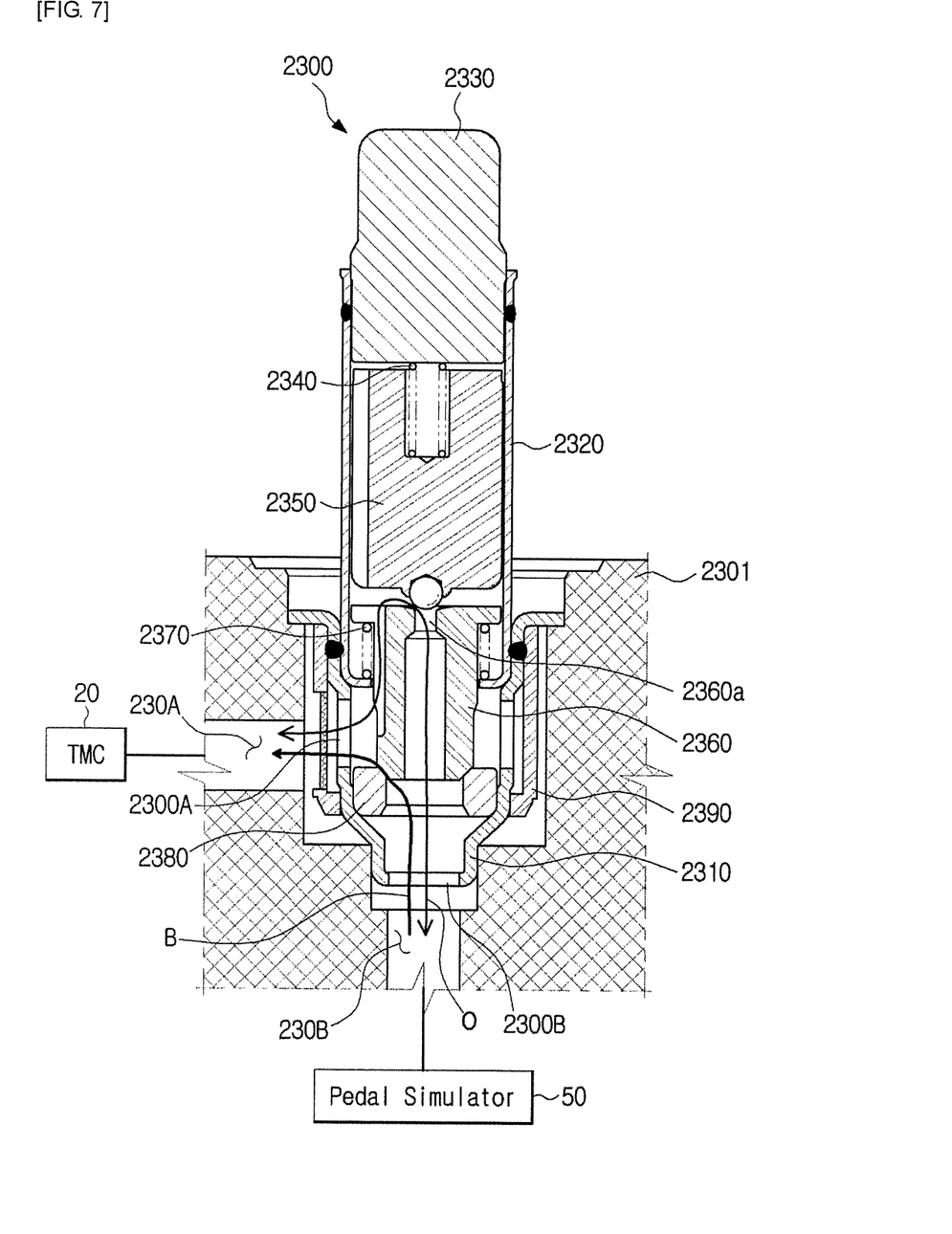
FIG. 7 is a side cross-sectional view illustrating an open simulator valve according to a third embodiment of the present disclosure.

FIG. 6 is a side cross-sectional view illustrating a simulator valve according to a third embodiment of the present disclosure. FIG. 7 is a side cross-sectional view illustrating an open simulator valve according to a third embodiment of the present disclosure. Referring to FIGS. 6 and 7, the simulator valve 2300 for the electronic brake system according to the third embodiment may include a sleeve 2320, an armature 2350, a first elastic member 2340, a first valve seat 2360, a second elastic member 2370, and a second elastic member 2370. A magnet core 2330 may be fastened to an upper part of the sleeve 2320, and a valve housing 2310 may be fastened to a lower part of the sleeve 2320. The armature 2350 may move upward and downward in the sleeve 2320. The first elastic member 2340 may be disposed between the magnet core 2330 and the armature 2350, and may provide elastic force to the armature 2350. The valve seat 2360 may be located below the armature 2350, and may have an orifice 2360*a* to be opened or closed by the armature 2350. The second elastic member 2370 may provide the first valve seat 2360 with elastic force in the direction of the armature 2350. The second valve seat 2380 may be fixed to the valve housing 2310. The unidirectional flow passage (B) may be opened or closed by upward or downward movement of the first valve seat 2360 disposed between the first valve seat 2360 and the second valve seat 2380.

The simulator valve 2300 may include a first opening 2300A located adjacent to the master cylinder 20 and a second opening 2300B located adjacent to the pedal simulator 50. The simulator valve 2300 may open or close the flow passage using the armature 2350 configured to move upward and downward by the magnet core 2330, and may control the amount of fluid (or oil) flowing in the bidirectional flow passage (0) through which the first port 230A is connected to the second opening 2300B and the second port 230B after passing through the first opening 2300A. In this case, the first port 230A may be provided at the side of the master cylinder 20, and the second port 230B may be provided at the side of the pedal simulator 50.

The valve housing 2310 may be embedded in a bore of a modulator block 2301. The modulator block 2301 may be formed as a rectangular block in which not only the simulator valve but also the above-mentioned constituent elements of the electronic brake system are embedded compactly and densely.

The sleeve 2320 may be press-fitted into the valve housing 2310, or is coupled to the valve housing 2310 by welding. The magnet core 2330 may be installed at an upper side of the sleeve 2320. The sleeve 2320 may accommodate the armature 2350 therein, and may restrict horizontal movement of the armature 2350 in a manner that the armature 2350 can move upward and downward only in a longitudinal direction. In this case, the sleeve 1320 may be press-fitted into the valve housing 1310 and coupled to the valve housing 1310 by welding.

The magnet core 2330 may be press-fitted into the upper side of the sleeve 1320, such that the open upper end of the sleeve 2320 is closed. Although not shown in the drawings, a coupling groove may be formed in the magnet core 2330, and the magnet core 2330 may be pressed to allow the sleeve 2320 to be caught in the coupling groove, such that the magnet core 2330 and the sleeve 2320 can be more closely and tightly coupled to each other. The above-mentioned coupling structure can facilitate coupling between the sleeve 2320 and the magnet core 2330 while simultaneously simplifying a coupling process, as compared to the conventional welding coupling scheme.

The armature 2350 may be installed to move upward and downward in the sleeve 2320, and a ball may be coupled to a lower end of the armature 2350 so that the armature 2350 may be in contact with the first valve seat 2360 having an orifice 2360a. An upper groove of the armature 2350 may be arranged to face the magnet core 2330, resulting in formation of a space in which the first elastic member 2340 is inserted to be described later.

One end of the first elastic member 2340 may be in contact with the upper groove of the armature 2350, and the other end of the first elastic member 2340 may be in contact with the magnet core 2330. The first elastic member 2340 may apply elastic force to the armature 2350 so that the simulator valve 2300 may remain closed in a normal state. When magnetic force does not occur in the magnet core 2330 in a normal state, the armature 2350 remains pressed downward by the first elastic member 2340. When the magnet core 2330 produces magnetic force, the armature 2350 moves upward so that the bidirectional flow passage (0) is opened through the orifice 2360a.

The first valve seat 2360 may be disposed between the armature 2350 and the second valve seat 2380, and may include the orifice 2360a that is opened or closed by the armature 2350 at the lower part of the armature 2350. In this case, one end of the second elastic member 2370 may be supported by a curved part of a lower end of the sleeve 2320, and the other end of the second elastic member 2370 may provide elastic force by pressurizing the first valve seat 2360.

The second valve seat 2380 may be fixed to the valve housing 2310, and may have a unidirectional flow passage (B) that is opened or closed by upward or downward movement of the first valve seat 2360. Here, in the unidirectional flow passage (B), under the condition that pressure of the pedal simulator 50 is higher than pressure of the master cylinder 20, if the sum of a difference in pressure between the pedal simulator 50 and the master cylinder 20 and force generated when the second elastic member 2370 pushes the armature 2350 is higher than force generated when the first elastic member 2340 pushes the armature 2350, the unidirectional flow passage (B) may be opened.

A filter member 2390 may include a mesh portion provided at the surface facing the first port 230A, and may be installed at the outer surface of the valve housing 2310. The filter member 2390 may prevent inflow or outflow of foreign materials contained in the operating fluid flowing through the bidirectional or unidirectional flow passage (0 or B).

The simulator valve 2300 including the above-mentioned constituent elements may include the bidirectional flow passage (0) formed when the armature 2350 moves upward by operation of the magnet core 2360, and the unidirectional flow passage (B) provided between the first valve seat 2360 and the second valve seat 2380. In this case, the bidirectional flow passage (0) may be opened by operation of the magnet core 2360, and the unidirectional flow passage (B) may be restrictively opened only when pressure of the simulator 50 is higher than pressure of the master cylinder 20. As a result, when the amount of fluid (or oil) flowing from the simulator 50 to the master cylinder 20 is instantaneously increased, the width of the flow passage may be increased in response to the increased amount of fluid.

Figure 8:
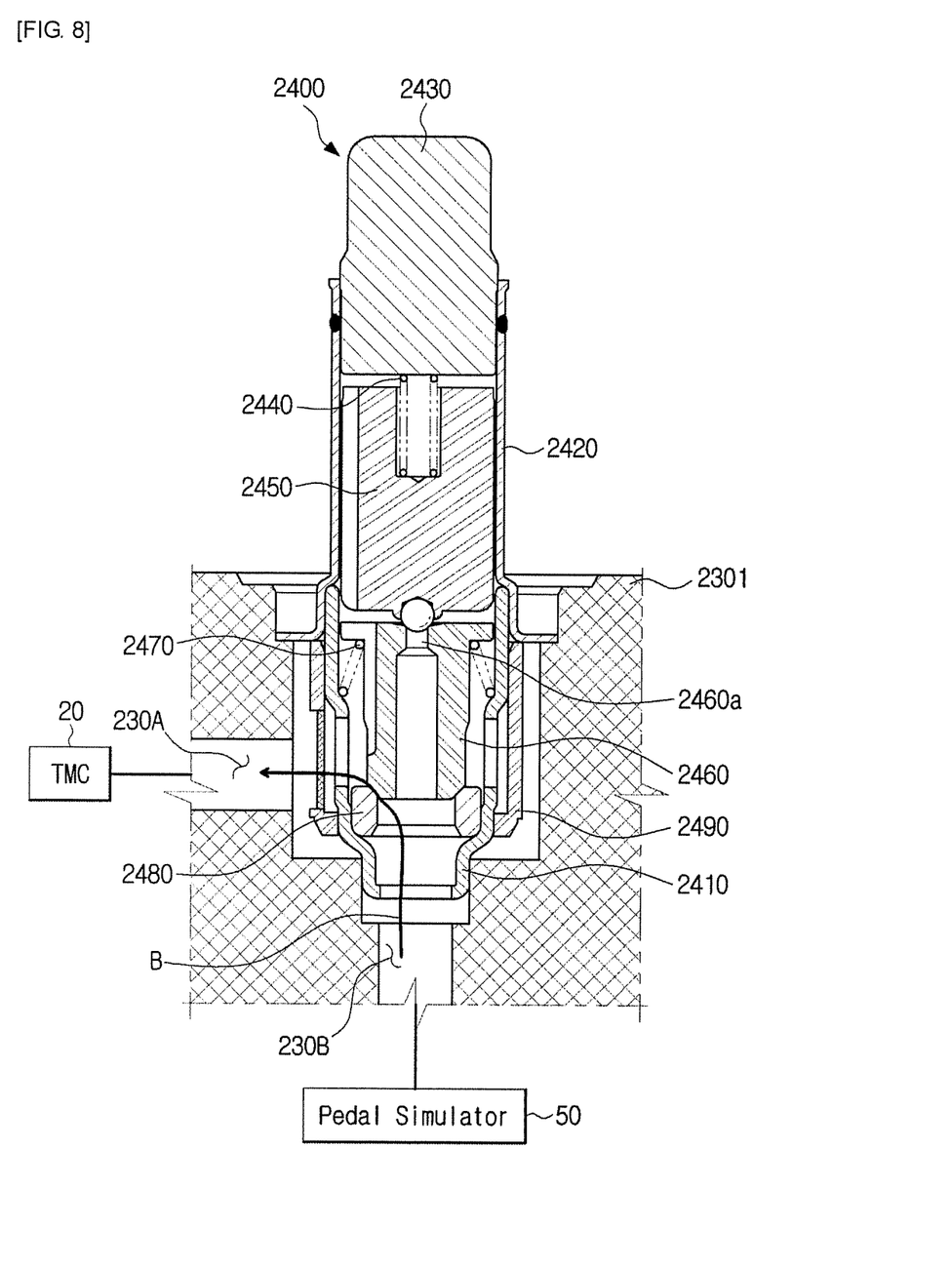
FIG. 8 is a side cross-sectional view illustrating an open simulator valve according to a fourth embodiment of the present disclosure.
Figure 9:
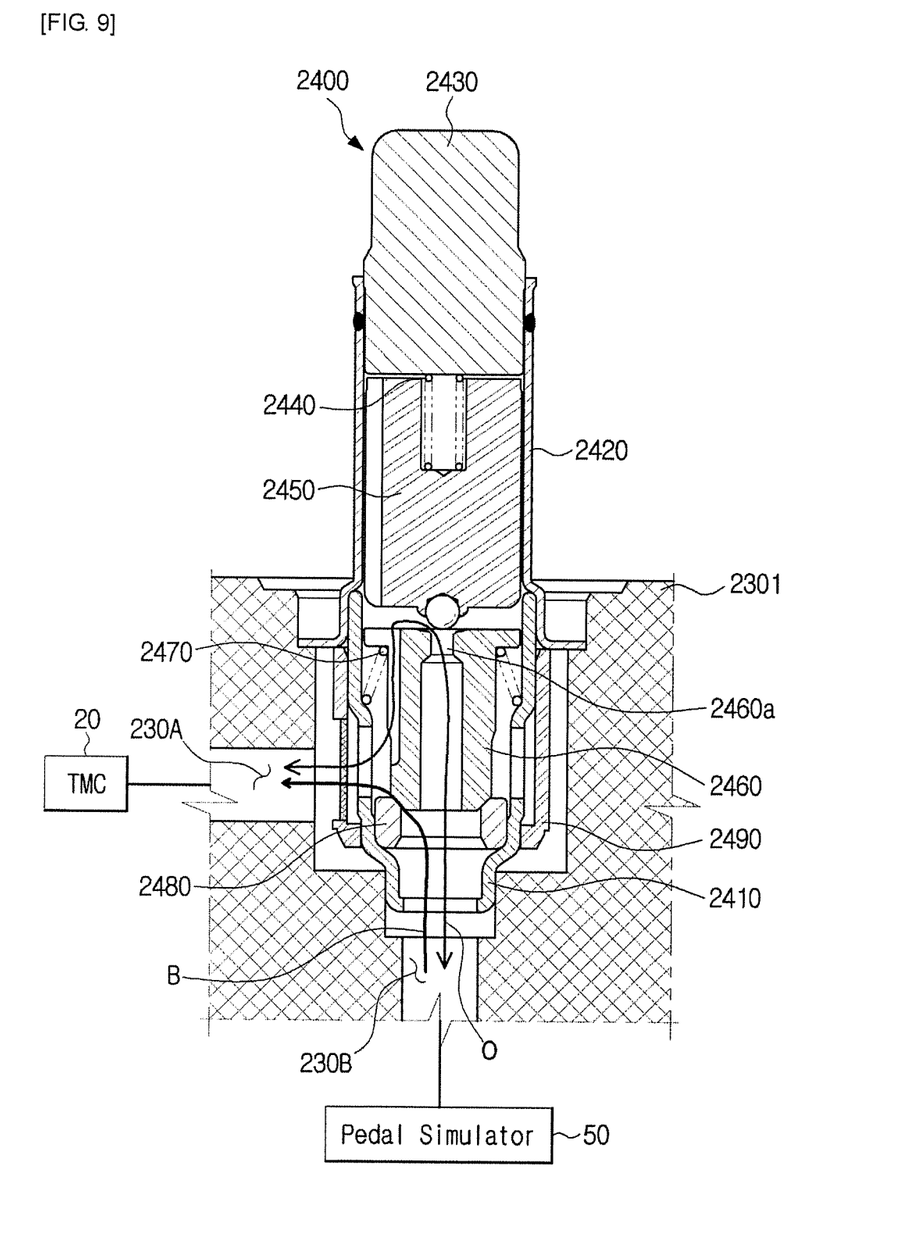
FIG. 9 is a side cross-sectional view illustrating an open simulator valve according to a fourth embodiment of the present disclosure.

FIG. 8 is a side cross-sectional view illustrating an open simulator valve according to a fourth embodiment of the present disclosure. FIG. 9 is a side cross-sectional view illustrating an open simulator valve according to a fourth embodiment of the present disclosure. Referring to FIGS. 8 and 9, the simulator valve 2400 configured to control opening or closing of a flow passage between the first port 230A and the second port 230A according to the fourth embodiment may include a sleeve 2420, an armature 2450, a first elastic member 2440, a first valve seat 2460, a second elastic member 2470, and a second valve seat 2480. The sleeve 2420 may guide upward or downward movement of the armature 2450, a magnet core 2430 may be fastened to an upper part of the sleeve 2420, and a valve housing 2410 may be fastened to a lower part of the sleeve 2420. The armature 2450 may move upward and downward in the sleeve 2420. The first elastic member 2440 may be disposed between the magnet core 2430 and the armature 2450, and may provide elastic force to the armature 2450. The first valve seat 2460 may be located below the armature 2450, and may have an orifice 2460a to be opened or closed by the armature 2450. The second elastic member 2470 may provide the first valve seat 2460 with elastic force in the direction of the armature 2450. The second valve seat 2480 may be fixed to the valve housing 2410. The unidirectional flow passage (B) may be opened or closed by upward or downward movement of the first valve seat 2460 disposed between the first valve seat 2460 and the second valve seat 2480.

In this case, one end of the second elastic member 2370 may be supported by an inclined surface of the valve housing 2310, and the other end of the second elastic member 2370 may provide elastic force by pressurizing the first valve seat 2360.

As is apparent from the above description, the electronic brake system according to the embodiments of the present disclosure may efficiently operate using a simulator valve provided with a check valve function, and may be easily manufactured at low costs.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic brake system comprising:
    a master cylinder provided with at least one cylinder chamber having a volume changeable according to operation of a pedal;
    a pedal simulator connected to the cylinder chamber, configured to provide reaction force corresponding to a pedal effort of the pedal;
    a hydraulic-pressure supply device configured to provide hydraulic pressure to at least one wheel cylinder;
    an electronic control unit (ECU) configured to operate the hydraulic-pressure supply device; and
    a simulator valve provided in a flow passage through which the master cylinder is connected to the pedal simulator, and provided with a unidirectional flow passage that allows fluid to flow from the pedal simulator to the cylinder chamber and a bidirectional flow passage configured to be opened or closed,
    wherein the simulator valve includes:
        a sleeve, an upper part of which is coupled to a magnet core and a lower part of which is coupled to a valve housing provided with an orifice;
        an armature configured to move upward and downward in the sleeve;
        a first elastic member disposed between the magnet core and the armature to provide elastic force to the armature; and
        a lip seal coupled to an outer surface of the valve housing, and provided with an inclined protrusion,
    wherein the unidirectional flow passage is opened in response to an inward deformation of the inclined protrusion when pressure of the pedal simulator is higher than pressure of the master cylinder,
    wherein the bidirectional flow passage is opened, in response to a movement of the armature by the magnet core receiving a current to open the orifice, and
    wherein the sleeve is press-fitted into an inner surface of the valve housing and is coupled to the valve housing by welding.

2. The electronic brake system according to claim 1, wherein the lip seal is configured to provide the unidirectional flow passage.

3. The electronic brake system according to claim 1, wherein the bidirectional flow passage is configured to be opened or closed by an electrical operation of the simulator valve.

4. A simulator valve comprising:
    a sleeve, an upper part of which is fastened to a magnet core and a lower part of which is fastened to a valve housing provided with an orifice;
    an armature configured to move upward and downward in the sleeve;
    a first elastic member disposed between the magnet core and the armature so as to provide elastic force to the armature;
    a lip seal fastened to an outer surface of the valve housing, and provided with an inclined protrusion;
    a unidirectional flow passage provided with the inclined protrusion, wherein the inclined protrusion is deformed inward when pressure of a pedal simulator is higher than pressure of a master cylinder such that the unidirectional flow passage is opened; and
    a bidirectional flow passage configured to open the orifice by movement of the armature after a current is supplied to the magnet core,
    wherein the sleeve is press-fitted into the valve housing and is coupled to the valve housing by welding.

* * * * *